United States Patent
Warwick

[11] 3,789,961
[45] Feb. 5, 1974

[54] MULTIPLE CHAMBER DISC BRAKE CALIPER ASSEMBLY

[75] Inventor: Edward H. Warwick, Englewood, Ohio

[73] Assignee: General Motors Corporation, Detroit, Mich.

[22] Filed: May 22, 1972

[21] Appl. No.: 255,687

[52] U.S. Cl................ 188/345, 92/75, 92/107, 92/108, 92/169, 188/352, 188/370
[51] Int. Cl.................. B60t 11/16, B60t 11/30
[58] Field of Search........ 188/106 P, 345, 352, 370; 60/54.6 M, 54.6 E; 92/50, 69 R, 75, 108, 109, 169, 171, 107

[56] References Cited
UNITED STATES PATENTS

| | | |
|---|---|---|
| 3,223,207 | 12/1965 | Burnett et al............... 188/352 |
| 3,403,602 | 10/1968 | Brandon, Jr................. 188/345 X |
| 3,502,181 | 3/1970 | Lepelletier................. 92/108 X |
| 3,517,782 | 6/1970 | Hayes....................... 92/110 X |
| 3,545,577 | 12/1970 | Harrison.................... 188/352 |
| 3,675,742 | 7/1972 | Thompson.................... 188/370 |

Primary Examiner—George E. A. Halvosa
Attorney, Agent, or Firm—D. D. McGraw

[57] ABSTRACT

The invention relates to a wheel brake for an automotive vehicle and, more particularly, to the caliper assembly provided as a part of a disc brake. The invention is further related to a brake wheel cylinder assembly for use in a disc brake assembly or other types of brakes requiring multiple chamber wheel cylinder actuation.

8 Claims, 12 Drawing Figures

MULTIPLE CHAMBER DISC BRAKE CALIPER ASSEMBLY

In recent years, most automotive vehicles have been provided with a brake system having a plurality of brake fluid circuits. Typically, a dual master cylinder is provided which has separate pressurizing chambers, each chamber being fluid connected to its own hydraulic brake circuit. Numerous arrangements have been proposed and used which connect the circuits to various brake elements of the brake vehicle. For example, most passenger cars of current manufacture have the rear wheel brakes actuated by one circuit and the front wheel brakes actuated by another circuit. Alternative connections have been proposed, including the use of dual chambers in the wheel cylinder assembly for each wheel of a set of wheels, with one brake circuit pressurizing one wheel cylinder chamber and the other brake circuit pressurizing the other wheel cylinder chamber. The chambers may be located in completely separate cylinders in the same housing or separate housings, or may be provided within one cylinder. When a single cylinder contains both pressurizing chambers, the use of a cup-shaped primary piston having fluidly separate effective areas in each chamber has been proposed. For example, U.S. Pat. No. 2,324,007 — MacPherson shows a two-circuit brake system separately pressurizing separate wheel cylinders at each vehicle wheel. U.S. Pat. No. 2,497,438 — Butler provides two pistons in a single wheel cylinder chamber, and they are independently pressure actuated to provide a service system and an alternate system of actuation. A brake assembly such as that disclosed in U.S. Pat. No. 3,388,775 — Baynes et al. may be arranged to have separate opposed pairs of pistons pressurized by separate brake circuits. U.S. Pat. No. 3,490,565 — Marschall shows a pair of pistons in an actuating cylinder with a direct-acting piston actuating one brake shoe assembly of a disc brake and another piston applying pressure to the brake housing or to a force-transmission frame extending beyond the disc to actuate the other brake shoe assembly, and a double-acting valve which maintains the effective cross-section of the actuating assembly in spite of loss of pressure in one of the two brake pressurizing circuits connected to separately actuate the two pistons. U.S. Pat. No. 3,517,782 — Hayes, discloses a cylinder having a cup-shaped piston with the piston head facing one of the friction elements, and another piston or plug reciprocably fitting within the cup-shaped piston so as to provide separate pressurizing chambers. The fixed caliper disc brake of U.S. Pat. No. 3,545,577 — Harrison has independent pairs of operating cylinders for con-nection to dual actuating circuits, the working spaces of the cylinders having passage means within at least part of the working spaces for bleeding the highest region of the working space above the bleed outlet with the passage means. A circular plate or a ring fitted in the operating cylinder with a tight fit so as to provide a small annular chamber or groove containing the highest region of working space which is in turn connected to the bleed outlet.

The invention disclosed and claimed herein relates to a specific brake construction having radially inner and outer pressure chambers which includes a device for improving the bleeding of the inner chamber to assure the removal of entrapped air from the uppermost portion of that chamber. Another feature of the invention relates to the use of three nested pistons, one of which is secured to the inner piston or alternatively to the outer piston so as to be able to change the effective area ratios of the two separate pressurizing chambers. Another and more specific aspect of the invention is the provision of the middle piston of the three nested pistons as a means for improving the bleeding of the inner pressure chambers. In its still more specific aspects, the invention relates to baffle arrangements for improving the bleeding of entrapped air from the inner pressure chamber in which that chamber is not defined by a housing outer wall at its highest portion, thereby obviating the provision of a bleed port directly at such highest portion. In still another aspect, the invention relates to arrangements for mounting the baffle and arrangements for mounting and retaining the inner piston. Another feature of the invention is the provision of several baffle member arrangements, none of which require a close radial tolerance fitting within a cylinder wall to accommodate inner chamber bleeding.

IN THE DRAWINGS

Figure 1:
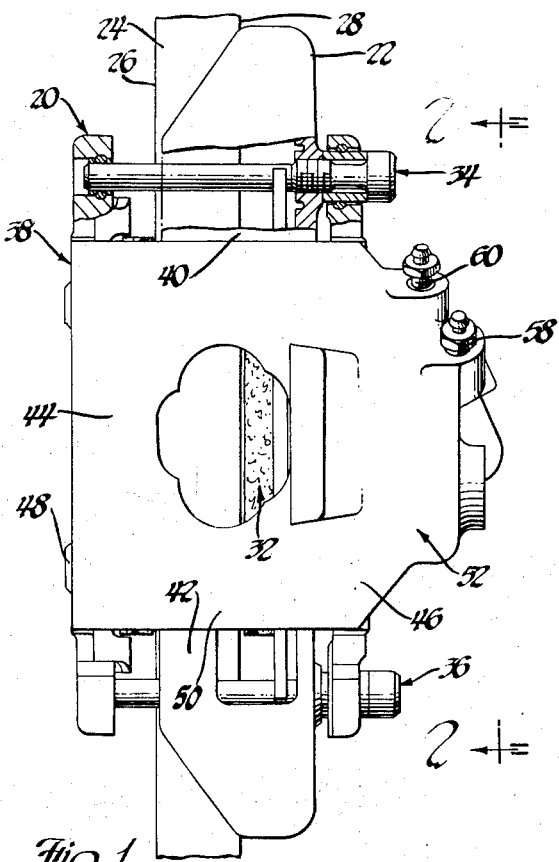
FIG. 1 is a plan view of a disc brake assembly embodying the invention with parts broken away and in section to show a typical sliding caliper mounting arrangement.
Figure 2:
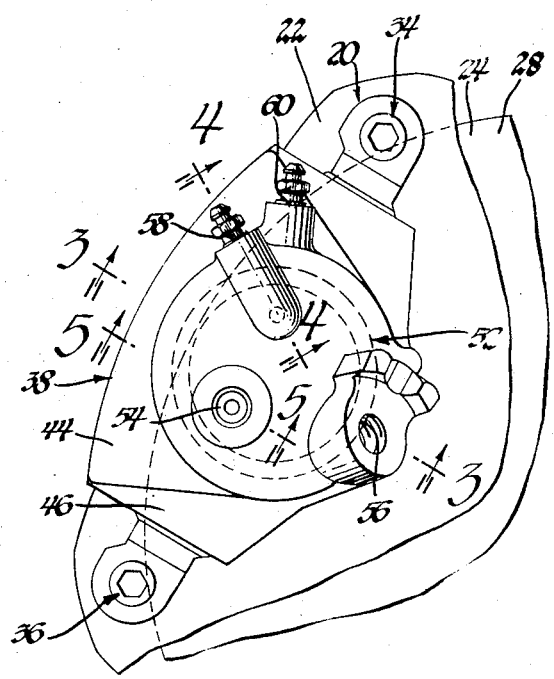
FIG. 2 is an elevation view of the brake assembly of FIG. 1 taken in the direction of arrows 2—2 of that FIGURE.
Figure 3:
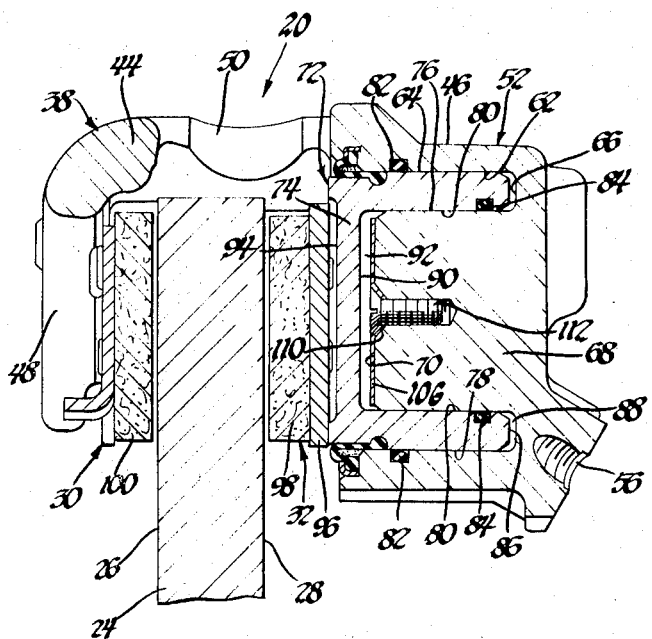
Figure 4:
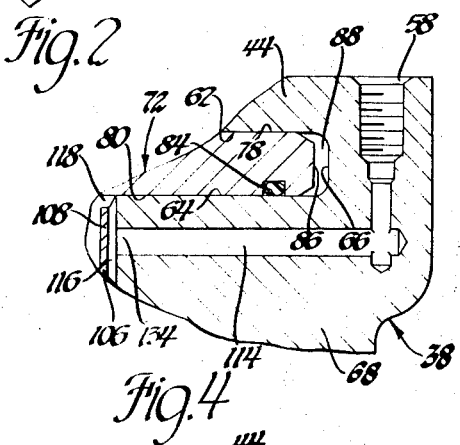
Figure 5:
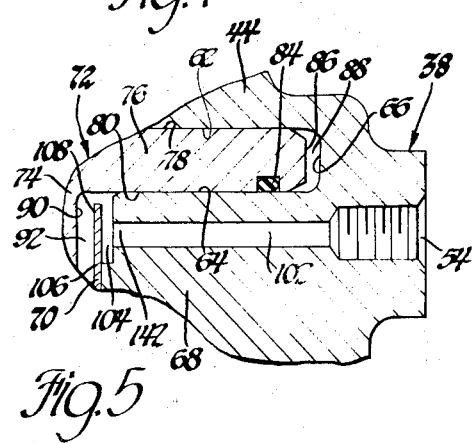

FIGS. 3, 4 and 5 are cross-section views of portions of the brake assembly of FIGS. 1 and 2 as taken in the direction of arrows 3—3, 4—4 and 5—5 of FIG. 2, and showing an embodiment of the invention in greater detail.

Figure 6:
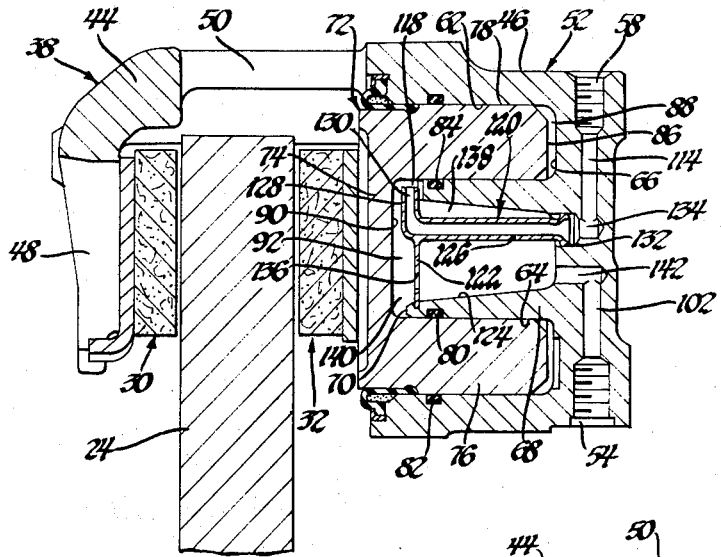

FIG. 6 is a cross-section view similar to FIG. 3 and showing a modification of the invention.

Figure 7:
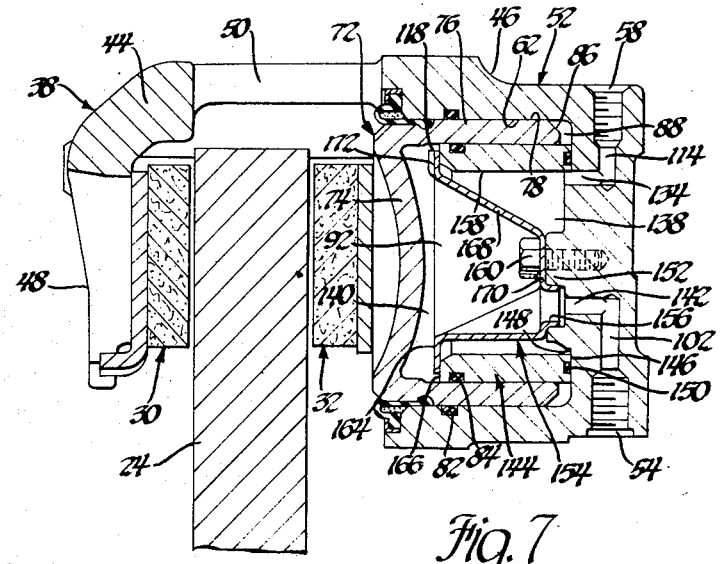
Figure 8:
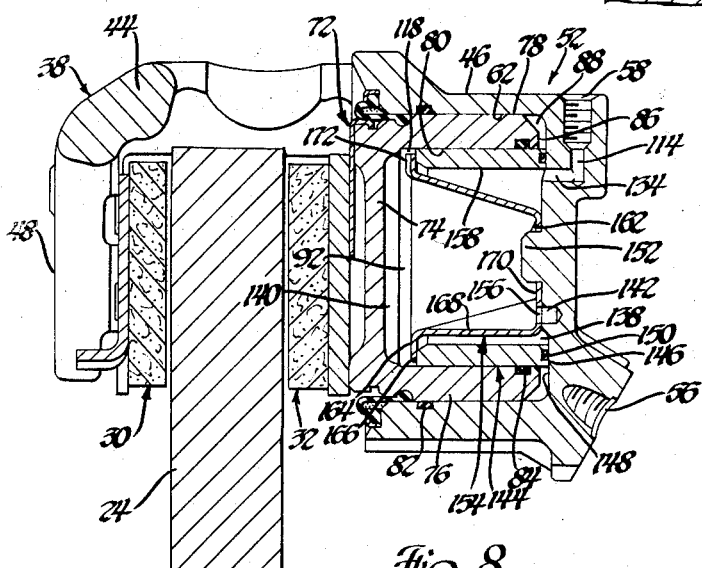

FIGS. 7 and 8 are cross-section views similar to FIG. 3 and showing another modification of the invention and different mounting arrangements for the baffle member.

Figure 9:
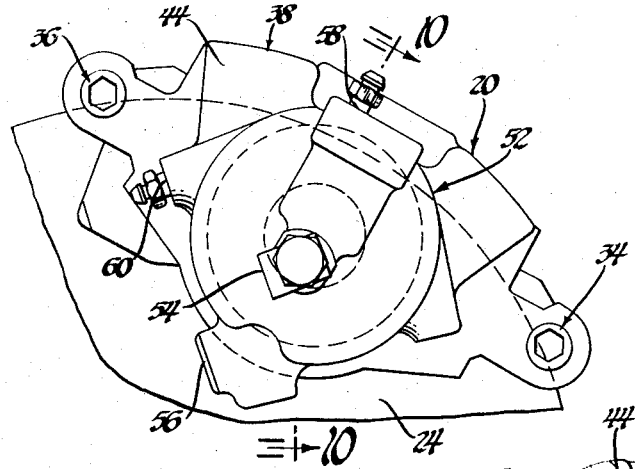

FIG. 9 is an elevation view of a brake assembly similar to the elevation view of FIG. 2 and showing a somewhat different external arrangement.

Figure 10:
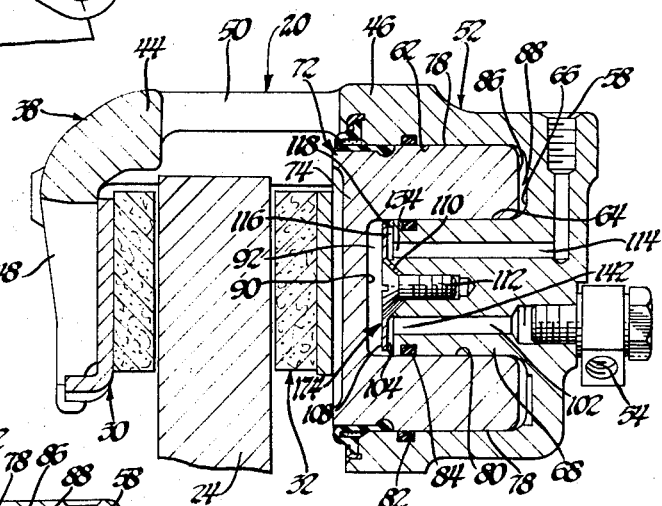

FIG. 10 is a cross-section view taken in the direction of arrows 10—10 of FIG. 9 and showing an embodiment of the invention which is of the same species as that shown in FIGS. 3-5.

Figure 11:
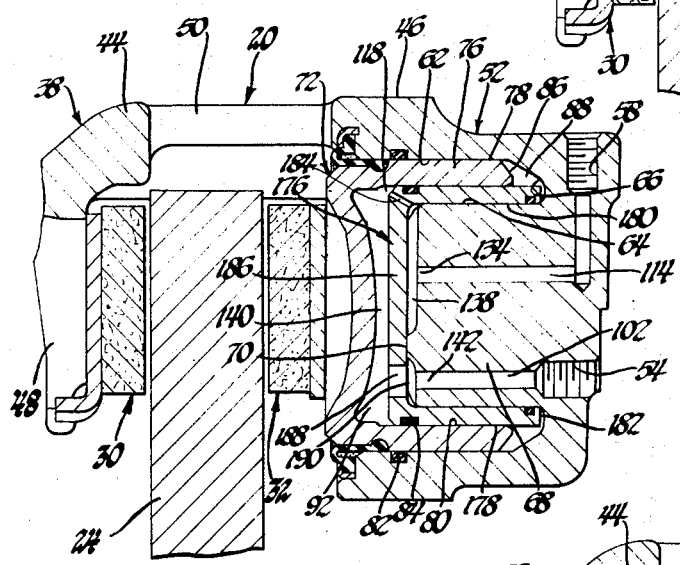

FIG. 11 is a cross-section view similar to that of FIG. 10 and showing another embodiment of the invention.

Figure 12:
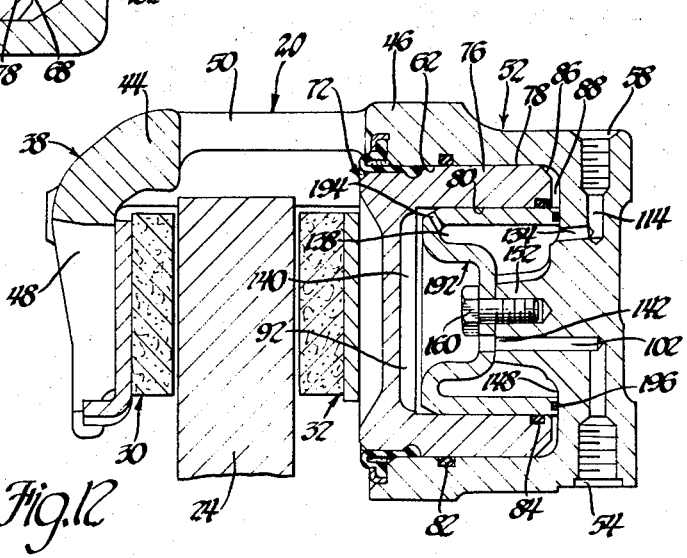

FIG. 12 is a cross-section view similar to FIG. 10 and showing another embodiment of the invention.

The brake assembly shown in FIG. 1 has the same overall arrangement as the brake assembly of U.S. Pat. No. 3,628,639, issued to Frank R. L. Daley, Jr., on Dec. 21, 1971. The invention may be utilized in other types of pressure actuated brake assemblies, either of the drum or disc type. However, the preferred embodiments are illustrated in a sliding caliper brake mechanism closely related to brake mechanisms in current production usage.

The brake assembly 20 includes a fixed support member 22 adapted to be mounted to a suitable portion of an automotive vehicle adjacent one of the vehicle wheels. The rotatable disc 24 is adapted to be mounted securely to the vehicle wheel to rotate therewith. The disc has opposed friction braking surfaces 26 and 28 arranged for frictional engagement by the friction pad assemblies 30 and 32 when the brakes are actuated. The guiding and retaining pin assemblies 34 and 36 are secured to the support member 22 at circumferentially spaced positions and extend over the outer periphery of the disc 24. The caliper assembly 38 is slidably mounted on the guiding and retaining pin assemblies 34 and 36 and the support member 22. The support member flanges 40 and 42 extend over the outer periphery of the disc 24 in circumferentially spaced relation so as to be positioned to receive brake torque from the caliper assembly 38 when the brakes are actuated. This arrangement is more particularly disclosed in U.S. Pat. No. 3,628,629, referred to above, and forms no part of the invention.

The caliper assembly 38 includes a caliper housing 44 formed to provide an inboard leg 46 positioned on the side of disc 24 adjacent friction surface 28, an outboard leg 48 positioned on the outboard side of disc 24 adjacent friction surface 26, and a bridging section 50 extending across the outer periphery of the disc 24 and connecting the legs 46 and 48. The inboard leg 46 contains the wheel cylinder assembly 52. The outboard friction pad assembly 30 is mounted so as to be engaged by the outboard leg 48 and forced against the disc friction surface 26 when the brake is actuated. The inboard friction pad assembly 32 is mounted between the wheel cylinder assembly 52 and the disc friction surface 28 so as to be moved against that disc friction surface, in braking relation when the brake is actuated. The friction pad assemblies 30 and 32 transfer braking torque to the caliper housing, which, in turn, transfers the torque to the support member 22 through the flange 40 or the flange 42, depending upon direction of rotation of disc 24. This general arrangement is likewise shown in U.S. Pat. No. 3,628,639, referred to above.

The wheel cylinder assembly 52 is shown in FIGS. 1 and 2 as having pressure inlet ports 54 and 56 and bleed ports 58 and 60 provided with suitable fittings for bleeding entrapped air out of the system. As will be described, there are two pressure chambers in the wheel cylinder assembly 52, so that pressure inlet port 54 and bleed port 58 serve the inner chamber while pressure inlet port 56 and bleed port 60 serve the outer pressure chamber. In all of the FIGURES of the drawings, a pressure inlet port and a bleed port and fitting is provided for each such chamber although due to section lines such ports and fittings are not always shown. Since the inner chamber has no outside housing wall at its higher portion to allow location of the bleed port at that point, other arrangements must be made to bleed that chamber.

Referring more particularly to FIGS. 3 through 5, the portion of housing 44 forming a part of the wheel cylinder assembly 52 has an annular recessed cylinder formed in the inboard leg 46 and opening toward the outboard leg 48. The cylinder is defined at its outer periphery by cylinder wall 62 and at its inner periphery by piston wall 64, these walls being in radially spaced relation and joined at the closed end of the annular cylinder by an end wall 66. The boss 68 of which piston wall 64 is provided is considered to be a second piston which in these FIGURES is integral with the housing 44. This piston extends from the end wall 66 toward housing leg 48 and terminates in a piston head 70 well within the axial and radial confines of cylinder wall 62.

A cup-shaped piston 72 has a piston head 74 and a piston skirt 76 is reciprocably received within the cylinder wall 62. The outer peripheral surface of piston skirt 76 defines a piston wall 78, mating with cylinder wall 62, and the inner peripheral surface of the piston skirt defines a cylinder wall 80, mating with the piston wall 64 of piston 68. Suitable piston seals 82 and 84 are respectively provided to seal the mating piston and cylinder walls against fluid leakage. The annular end surface 86 of piston skirt 76 faces the end wall 66 of the housing and cooperates with the annular end wall 66, the cylinder wall 62 and the piston wall 64 to define an outer pressure chamber 88. Pressure inlet port 56 and bleed port 60 are connected to chamber 88, as discussed above. The piston head 74 is positioned intermediate the inboard shoe assembly 32 and the piston 68 so that the inner surface 90 of head 74 cooperates with piston head 70 and cylinder wall 80 to define the inner pressure chamber 92. The outer surface 94 of piston head 74 is arranged to be in engagement with the shoe 96 of the inboard friction pad assembly 32 so that movement of piston 72 toward the disc 24 will move the lining 98 of the inboard friction pad assembly 32 into frictional engagment with the friction surface 28 of the disc 24. As is the manner of operation of sliding caliper disc brake assemblies of this type, the pressure in the pressurizing chambers 88 and 92 act on the caliper housing to move the caliper in a direction opposite to movement of the piston 72 so as to move the lining 100 of the outboard shoe assembly 30 into frictional engagement with the disc friction surface 26.

As is best seen in FIG. 5, the pressure inlet port 54 is connected through passage 102, formed in the portion of housing 44 from which piston 68 is provided, to a recess 104 which is a part of the inner pressure chamber 92. The recess is provided by a cutaway portion in the face of the piston head 70. A baffle 106, which is formed with an annular flange 108 and a center retaining section 110, is secured to the piston head 70 by suitable means such as screw 112. The flanged section 108 extends radially outwardly adjacent to a position adjacent to but spaced radially inwardly from the cylinder wall 80, so that the flange covers much of the recess 104, but provides sufficient peripheral clearance to permit fluid entering through port 54 and passage 102 to fill inner chamber 92. Also, this peripheral clearance obviates the necessity of a tight fit of the flange outer periphery against cylinder wall 64.

As is best seen in FIG. 4, the bleed port 58 is connected by passage 114, formed in the portion of housing 44 from which piston 68 is provided, to a recess 116, which is also a part of inner chamber 92. The recess 116 is provided by another cutaway portion in the face of the piston head 70. The recess is located at the uppermost portion of the face 70 of piston 68 that the radial clearance between the flange 108 and the cylinder wall 80 at the recess is at the uppermost part 118 of chamber 92. As can be seen in FIG. 4, flange 108 overlies recess 116 so that when the brake is being bled, fluid from the portion of inner chamber 92 defined by the baffle 106 and the head inner surface 90 moves toward the bleed port 58, it passes through the uppermost portion 118 of chamber 92, where air is most likely to be trapped, and washes the air out of this uppermost chamber portion, through recess 116 and passage 114 and out bleed port 58 and its fitting which has been opened for the purpose.

The modifications shown in the other FIGURES will be described utilizing the same reference numerials for related portions, except for the baffle and the parts immediately related to the modified structure. In the modification of FIG. 6, the baffle 120 includes a disc section 122 which is secured to the end of the piston 68 adjacent the piston head 70, the piston 68 in this construction being recessed as shown at 124. The baffle 120 also has a tubular section 126 which extends through the disc section 122 and terminates at one end 128 to provide an inlet 130 at the uppermost portion 118 of inner chamber 92. The other end 132 of tubular section 126 terminates in the inlet 134 of the bleed passage 114 leading to bleed port 58. The baffle's disc section has an aperture 136 formed therethrough connecting the portion 138 of chamber 92 on one side of the baffle with the portion 140 of chamber 92 on the other side of the baffle. It can be seen that the tubular section 126 provides a bleed tube extending through the chamber portion 138 so that the bleed passage 114 is connected only with the uppermost portion 118 of chamber 92. Pressurized brake fluid enters through inlet port 54 and passage 102, which has an outlet 142 opening into the portion 138 of chamber 92. The pressurized fluid readily passes through aperture 136 of baffle 120 so that all portions of the chamber 92 are filled with pressurized brake fluid. When the bleed fitting in port 58 is open to bleed the brakes and brake fluid is supplied in this manner, the brake fluid passes upwardly in chamber portion 140 and washes through the uppermost chamber portion 118 as it passes into the tubular inlet 130, thereby washing any entrapped air with it outwardly through the tubular section 126, passage 114 and bleed port 58.

FIGS. 7 and 8 show another modification of the invention and the reference numerals utilized in the description below will follow the same pattern as discussed above. The inner piston 144 in this modification is formed from an annular sleeve instead of being an integral part of the housing 44. One end 146 of piston 144 abuts the end wall 148 formed by a portion of the housing 44, and a seal 150 is positioned at this point so that the outer chamber 88 is sealed from the inner chamber 92. The inlet 134 of bleed passage 114 opens through the end wall 148 radially inwardly of annular piston 144, as does the outlet 142 of pressure inlet passage 102 to which pressure inlet port 54 is connected. A boss 152 extends slightly into chamber 92 from end wall 148 and provides a mount for the baffle and retainer member 154. In FIG. 7, a portion of the boss 152 is recessed about pressure outlet 142 so that the opening 156 in a portion of the baffle and retainer member 154 extends into the recess and locates the baffle as well as providing pressure access from pressure outlet 142 to portion 140 of chamber 92. The portion 138 of chamber 92 is on the other side of the baffle and retainer member 154 from the chamber portion 140, and is defined at its outer periphery by the inner wall 158 of inner piston 144. In FIG. 7, the member 154 has its cylinder retaining section attached to boss 152 by screw 160, while in FIG. 8 the cylinder retaining section is provided with spring fingers 162, formed as a part of member 154, which engage boss 152 and lock the member in position.

The baffle and retainer member 154 is generally cup shaped, with the center retaining section 170 at the bottom of the cup and an outwardly flanged section 164 at the open end of the cup. The outwardly flanged section engages the other end 166 of inner piston 144 and acts to retain the inner piston axially in position against the housing end wall 148. As shown, member 154 is made out of sheet metal and is sufficiently spring-like to maintain axial tension on piston 144 when retained in position on boss 152. The baffle and retainer member intermediate section 168 joining the flanged section 164 and the center retaining section 170 are positioned radially inwardly of annular piston 144 so that there is radial clearance therebetween at all times. The uppermost portion of the flanged section 164 of the retainer member is deformed in an axial direction to provide a passage 172 which opens at the uppermost portion 118 of chamber 92 and provides fluid communication between that uppermost portion and the chamber portion 138 to which the bleed inlet 134 is connected. Thus, when pressurized fluid enters chamber section 140 of chamber 92 through pressure inlet 142, and the bleed fitting is open in order to bleed the brakes, the fluid passes through the uppermost chamber portion 118 and washes any air entrapped therein out through chamber portion 138, the bleed inlet 134, bleed passage 114, and bleed port 58.

The brake assembly generally shown in FIG. 9 has a somewhat different location of external parts such as the inlet ports and bleed fittings, but is sufficiently similar to the assembly shown in FIG. 2 in a similar view to require no detailed description. The bleed fittings of ports 58 and 60 are again located so as to be operatively connected to the uppermost portions of the respective pressure chambers served by them.

The embodiment of the invention shown in FIG. 10 includes a baffle 174 which is quite similar to and of the same species as the baffle 106 of FIGS. 3-5. However, the respective positions of the recesses 104 and 116 in relation to the entire assembly are better illustrated. Also, the proportioning of the effective areas of the two chambers is somewhat different, it being apparent in FIGS. 3-5 that the effective chamber areas are substantially identical, while in FIG. 10 the effective area of outer chamber 88 is substantially larger than the effective area of inner chamber 92. In the arrangement of FIG. 10, the brake system connections would be such that one brake fluid circuit would be connected to the outlet chambers 88 of the front wheel brakes of the vehicle and another brake fluid circuit would be connected to the inner chambers 92 of the front wheel brakes and to the wheel cylinders of the rear wheel brakes. In this arrangement, the effective areas of the outer chambers 88 would provide approximately 50 percent of the effective braking effort, the inner chamber 92 would provide approximately 20 percent of the effective braking effort, and the rear wheel brakes would provide the remaining 30 percent of the effective braking effort. Thus, if one circuit should become immobilized, there remains 50 percent of the braking effort in any case, with the possibility that the remaining circuit actuates both brakes in one instance and in the other instance provides effective braking on the front wheel brakes only. Other effective area ratios may be utilized, depending upon the installation and the characteristic requirements of the braking system.

FIG. 11 shows an arrangement in which the same brake elements may be utilized to provide either of two ratios. In this arrangmeent, outer piston 72 and the inner piston 68 are arranged much like that shown in FIGS. 3-5 and 10 except that another cup-shaped piston 176 is provided intermediate piston 68 and 72. Piston 176 is secured either to piston 72 or to piston 68, depending upon the desired effective area ratio. To accomplish this, two sizes of piston 176 would normally be manufactured, one having a larger outer diameter of its outer peripheral surface 178 so that the piston 176 would be press-fitted into piston 72. The inner surface 180 of piston 176 would be of sufficient size in relation to surface 64 of piston 68 to move reciprocably thereon. Thus, piston 176 would effectively be a part of piston 72 and the area of its skirt end surface 182 would be added to the area of the skirt end surface 86 of piston 72 to define the total effective working area of outer chamber 88. However, on the other hand, when the effective area subtended by piston end surface 182 is to be added to the effective area of the inner chamber 92, piston 176 is so manufactured that there is a slip fit between the piston outer wall 178 and the inner cylinder wall 80 of piston 72, and there is a press fit between piston inner wall 180 and the piston wall 64 of piston 68. If found preferable, other means for attaching piston 176 to one of the other pistons may be used.

Piston 176 also acts as a baffle, and is provided with a passage 184 connecting the uppermost portion 118 of chamber 92 with the portion 138 of chamber 92 to which the bleed passage 114 is connected. The head 186 of piston 176 serves to separate portions 138 and 140 of chamber 92, which portions are joined by opening 188 in head 186, this opening connecting with the recess 190 formed in the end surface or head 70 of piston 68. A similar recess formed in the head provides one wall of the chamber portion 138. Pressure inlet passage 102 has its outlet 142 connected with recess 190. When piston 176 is secured to piston 68, pressure fluid passing through outlet 142 must also pass through recess 190, opening 188, and chamber portion 140, thereby forcibly washing air from chamber uppermost portion 118 through passage 184 and chamber section 138 and bleed passage 114 and out of the bleed port 58 when the fitting of that port is open. The position and size of opening 188 relative to outlet 142 is such that a substantial portion of the fluid will pass through chamber portion 140 and will wash through chamber uppermost portion 118 during the bleeding operation when piston 176 is secured to and moves with piston 72, effectively removing air otherwise trapped in chamber uppermost portion 118.

FIG. 12 has a baffle 192 which functions in the same manner as the baffle of the other embodiments, but is also formed to embody the inner, fixed piston comparable to piston 68 of FIGS. 3–5 and 10, for example. Baffle 192 has a port 194 similar to passage 184 of FIG. 11, is sealed at its skirt end surface 196 against the end wall 148 in a manner similar to that shown in FIGS. 7 and 8, and is attached to the boss 152 by suitable retaining means such as screw 160. The general operation is the same as that discussed with regard to FIGS. 7 and 8, for example.

What is claimed is:

1. A disc brake caliper assembly comprising:
a caliper housing having a recessed cylinder bore, a first piston reciprocably received in said recessed cylinder bore and formed with a piston head and annular piston skirt defining a recessed cylinder therein;
a second piston reciprocably received in said first piston recessed cylinder and defining therewith and in cooperation with said caliper housing an inner chamber;
said first piston skirt and said caliper housing recessed cylinder bore and said second piston defining an outer chamber fluidly separate from said inner chamber, separate first passage means in said housing for conducting brake fluid under pressure to each of said chambers from separate brake fluid circuits, separate second passage means in said housing for bleeding each of said chamber;
and fluid directing means in said inner chamber positioned relative to the inlet of the one of said second passage means connected with said inner chamber to direct fluid being bled through an uppermost portion of said inner chamber to wash any air in said inner chamber out through the one of said second passage means when bleeding the assembly, said fluid directing means including a baffle secured to said caliper housing and having a passage section formed to direct brake fluid bleed from a portion of said inner chamber adjacent the outlet of the one of said first passage means connected with said inner chamber through an uppermost part of said inner chamber and then to the inlet of the one of said second passage means connected with said inner chamber;
said baffle having a flanged outer section and a center retaining section, said baffle center retaining section being secured by retaining means to said second piston, said second piston being a boss integrally formed as a part of said caliper housing and having said one of each of said first and second passage means formed therethrough and having an annular end surface facing said first piston head and engaged by said baffle flanged outer section, said fluid directing means passage section being formed by an opening defined by a portion of said baffle flanged outer section and a portion of said second piston annular end surface, whereby brake fluid entering said inner chamber passes around a part of said flanged outer section and then through a part of said inner chamber and then around another part of said flanged outer section and then to the inlet of the one of said second passage means connected with said inner chamber.

2. A disc brake caliper assembly comprising:
a caliper housing having a recessed cylinder bore,
a first piston reciprocably received in said recessed cylinder bore and formed with a piston head and annular piston skirt defining a recessed cylinder therein;
a second piston reciprocably received in said first piston recessed cylinder and defining therewith and in cooperation with said caliper housing an inner chamber;
said first piston skirt and said caliper housing recessed cylinder bore and said second piston defining an outer chamber fluidly separate from said inner chamber, separate first passage means in said housing for conducting brake fluid under pressure to each of said chambers from separate brake fluid circuits, separate second passage means in said housing for bleeding each of said chambers;
and fluid directing means in said inner chamber positioned relative to the inlet of the one of said second passage means connected with said inner chamber to direct fluid being bled therefrom through an uppermost portion of said inner chamber to wash any air in said inner chamber out through the one of said second passage means when bleeding the assembly, said fluid directing means including a baffle secured to said caliper housing and having a passage section formed to direct brake fluid bleed flow from a portion of said inner chamber adjacent the outlet of the one of said first passage means connected with said inner chamber through an uppermost part of said inner chamber and then to the inlet of the one of said second passage means connected with said inner chamber;

said baffle having a flanged outer section and a center retaining section and being fixed to said caliper housing by retaining means, said second piston having an annular end surface facing said first piston head and engaged by said flanged outer section, said second piston being an annular sleeve and said baffle flanged outer section retaining said second piston axially against said caliper housing in sealing relation radially outward of said outlet of the one of said first passage means and said inlet of the one of said second passage means connected with said inner chamber, said fluid directing means passage section being formed by an opening defined by a portion of said baffle flanged outer section and a portion of said second piston annular surface.

3. A disc brake caliper assembly comprising:
a caliper housing having a recessed cylinder bore,
a first piston reciprocably received in said recessed cylinder bore and formed with a piston head and annular piston skirt defining a recessed cylinder therein;
a second piston reciprocably received in said first piston recessed cylinder and defining therewith and in cooperation with said caliper housing an inner chamber;
said first piston skirt and said caliper housing recessed cylinder bore and said second piston defining an outer chamber fluidly separate from said inner chamber, separate first passage means in said housing for conducting brake fluid under pressure to each of said chambers from separate brake fluid circuits, separate second passage means in said housing for bleeding each of said chambers;
and fluid directing means in said inner chamber positioned relative to the inlet of the one of said second passage means connected with said inner chamber to direct fluid being bled therefrom through an uppermost portion of said inner chamber to wash any air in said inner chamber out through the one of said second passage means when bleeding the assembly, said fluid directing means including a baffle secured to said caliper housing and having a passage section formed to direct brake fluid bleed flow from a portion of said inner chamber adjacent the outlet of the one of said first passage means connected with said inner chamber through an uppermost part of said inner chamber and then to the inlet of the one of said second passage means connected with said inner chamber, said baffle also including a disc section secured to the end of said second piston and a tubular section, said tubular section extending through said disc section and terminating at one end with an inlet at the uppermost portion of said inner chamber and at the other end in the inlet of said one of said second passage means connected with said inner chamber, said baffle disc section having an aperture therein connecting the portions of said inner chamber on opposite sides of the baffle disc section.

4. A disc brake caliper assembly comprising:
a caliper housing having a recessed cylinder bore,
a first piston reciprocably received in said recessed cylinder bore and formed with a piston head and annular piston skirt defining a recessed cylinder therein;
a second piston reciprocably received in said first piston recessed cylinder and defining therewith and in cooperation with said caliper housing an inner chamber;
said first piston skirt and said caliper housing recessed cylinder bore and said second piston defining an outer chamber fluidly separate from said inner chamber, separate first passage means in said housing for conducting brake fluid under pressure to each of said chambers from separate brake fluid circuits, separate second passage means in said housing for bleeding each of said chambers;
and fluid directing means in said inner chamber positioned relative to the inlet of the one of said second passage means connected with said inner chamber to direct fluid being bled therefrom through an uppermost portion of said inner chamber to wash any air in said inner chamber out through the one of said second passage means when bleeding the assembly, said fluid directing means including a baffle dividing said inner chamber into a first poriton defined in part by said first piston head and a second portion defined in part by said caliper housing, said baffle providing at least a wall of a first passage operatively connecting the outlet of said one of said first passage means to said inner chamber first portion and at least a wall of a second passage operatively connecting the uppermost portion of said inner chamber first portion to the inlet of the one of said second passage means connected with said inner chamber, said baffle being a cup-shaped member having a head and a sleeve section with the open end thereof extending axially away from said first piston head, said baffle being selectively secured to said first piston to function as an integral part thereof with said sleeve section being radially inward of said first piston skirt and increasing the effective annular area of said outer chamber,
or to said second piston to function as an integral part thereof with said sleeve section being radially inward of said first piston skirt and defining the wall of said second piston reciprocably mating with said first piston recessed chamber and increasing the effective annular area of said inner chamber,
whereby the relative effective areas of said inner and outer chambers may be modified.

5. A brake wheel cylinder assembly comprising:
a housing having a cylinder formed therein defined by an end wall and an internal cylindrical wall;
a first piston having a head and an annular skirt and reciprocably received in said housing cylinder with the outer cylindrical surface of said annular skirt mating with said housing cylinder internal cylindrical wall and the inner cylindrical surface of said annular skirt forming an internal cylindrical wall, the open end surface of said skirt facing said housing cylinder end wall and defining a first pressure chamber in cooperation with said housing cylinder end and internal cylindrical walls;

a second piston having an outer cylindrical surface wall received in said first piston skirt in reciprocable relation to said skirt internal cylindrical wall, said second piston defining a second pressure chamber at least in part in cooperation with said first piston;

a divider separating said second pressure chamber into a first portion defined in part by said first piston head and a second portion defined in part by a portion of said housing, said divider having a retaining flange thereon engaging said second piston and having means removably securing said divider to said housing cylinder end wall and thereby retaining said second piston axially in position against said housing cylinder end wall;

a brake actuating pressure supply passage in said housing connected with said second pressure chamber first portion;

a brake bleed passage in said housing connected with said second pressure chamber second portion;

and passage means at the uppermost part of said second pressure chamber first portion connecting the same to said second pressure chamber second portion to wash out entrapped air when bleeding said second pressure chamber.

6. The brake wheel cylinder assembly of claim 5, said divider retaining flange and said housing cylinder end wall permitting limited radial movement of said second piston relative thereto to accommodate radial alignment of said second piston in said first piston.

7. A rake wheel cylinder assembly comprising:

a housing having a cylinder formed therein defined by an end wall and an internal cylindrical wall;

a first piston having a head and an annular skirt and reciprocably received in said housing cylinder with the outer cylindrical surface of said annular skirt mating with said housing cylinder internal cylindrical wall and the inner cylindrical surface of said annular skirt forming an internal cylindrical wall, the open end surface of said skirt facing said housing cylinder end wall and defining a first pressure chamber in cooperation with said housing cylinder end wall and said housing cylinder internal cylindrical wall;

a second pressure chamber in said housing having first and second chamber portions;

a second piston having a head, an annular skirt provided with an inner cylindrical surface wall and an outer cylindrical surface wall received in said first piston skirt and mating with said first piston skirt internal cylindrical wall, said second piston defining said second pressure chamber first portion at least in part in cooperation with said first piston;

a third piston extending into said housing cylinder from said cylinder end wall and having an outer cylindrical surface wall mating with the inner cylindrical surface wall of said second piston and an end surface wall cooperating with the head of said second piston to define therewith the axial ends of said second pressure chamber second portion;

a brake actuating pressure supply passage and a brake bleed passage in said third piston connected with said second pressure chamber, said brake bleed passage being connected with said second pressure chamber second portion at the upper part thereof, and a passage through said second piston connecting the uppermost part of said second pressure chamber first portion with said second pressure chamber second portion.

8. The brake wheel cylinder assembly of claim 7, said second piston being secured to one of and reciprocably movable relative to the other of said first and third pistons whereby the annular effective area of said second piston annular skirt is a part of said first pressure chamber effective area when said second piston is secured to said first piston and is a part of said second pressure chamber effective area when said second piston is secured to said third piston.

* * * * *

PO-1050
(5/69)

UNITED STATES PATENT OFFICE
CERTIFICATE OF CORRECTION

Patent No. 3,789,961  Dated February 5, 1974

Inventor(s) Edward H. Warwick

It is certified that error appears in the above-identified patent and that said Letters Patent are hereby corrected as shown below:

```
Column 1, line 52, "con-nection" should read
                   -- connection --.
Column 3, line 12, patent number "3,628,629" should
                   read -- 3,628,639 --.
Column 10, line 32, "poriton" should read -- portion --.
Column 11, line 34, "Arake" should read -- A brake --.
```

Signed and sealed this 16th day of July 1974.

(SEAL)
Attest:

McCOY M. GIBSON, JR.  C. MARSHALL DANN
Attesting Officer     Commissioner of Patents